United States Patent
Yoshida et al.

(10) Patent No.: US 11,169,275 B2
(45) Date of Patent: Nov. 9, 2021

(54) SIGNAL ACQUISITION DEVICE

(71) Applicant: MITSUBISHI ELECTRIC CORPORATION, Tokyo (JP)

(72) Inventors: Naoto Yoshida, Tokyo (JP); Nobuhiro Suzuki, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 185 days.

(21) Appl. No.: 16/471,516

(22) PCT Filed: Jan. 26, 2017

(86) PCT No.: PCT/JP2017/002730
§ 371 (c)(1),
(2) Date: Jun. 19, 2019

(87) PCT Pub. No.: WO2018/138830
PCT Pub. Date: Aug. 2, 2018

(65) Prior Publication Data
US 2020/0018862 A1 Jan. 16, 2020

(51) Int. Cl.
| G01S 19/30 | (2010.01) |
| G01S 19/24 | (2010.01) |
| G01S 19/37 | (2010.01) |
| H04B 1/7075 | (2011.01) |
| H04B 1/7085 | (2011.01) |
| H04B 1/709 | (2011.01) |

(52) U.S. Cl.
CPC ............ *G01S 19/30* (2013.01); *G01S 19/246* (2013.01); *G01S 19/37* (2013.01); *H04B 1/709* (2013.01); *H04B 1/7075* (2013.01); *H04B 1/7085* (2013.01)

(58) Field of Classification Search
CPC ........ G01S 19/30; G01S 19/246; G01S 19/37; H04B 1/7075; H04B 1/7085; H04B 1/709
See application file for complete search history.

(56) References Cited

U.S. PATENT DOCUMENTS

| 2011/0156954 A1* | 6/2011 | Roh | G01S 19/22 |
| | | | 342/357.69 |
| 2013/0039392 A1* | 2/2013 | Chu | G01S 19/246 |
| | | | 375/150 |
| 2015/0369924 A1* | 12/2015 | Hedgecock | G01S 5/0072 |
| | | | 342/357.34 |

(Continued)

OTHER PUBLICATIONS

Internaional Search Report for PCT/JP2017/002730 (PCT/ISA/210) dated Apr. 11, 2017.

(Continued)

*Primary Examiner* — Dac V Ha
(74) *Attorney, Agent, or Firm* — Birch, Stewart, Kolasch & Birch, LLP

(57) ABSTRACT

A signal acquiring unit (3) performs signal detection and initial synchronization on an output from a RF frontend (2) by performing circular convolution operation using a first code replica corresponding to a case where a ranging code does not change in polarity and a second code replica corresponding to a case where a ranging code changes in polarity. A signal tracking unit (4) performs synchronization tracking using a result of signal acquisition output from the signal acquiring unit (3) as an initial value.

5 Claims, 6 Drawing Sheets

(56) References Cited

U.S. PATENT DOCUMENTS

2020/0064492 A1* 2/2020 Musella .................. G01S 19/36

OTHER PUBLICATIONS

Jeon et al., "Bit Transition Cancellation Signal Acquisition Method for Modernized GPS and Galileo Signal", Proceedings of the 24th International Technical Meeting of The Satellite Division of the Institute of Navigation (ION GNSS 2011), The Institute of Navigation, Sep. 23, 2011, pp. 1028-1039.

Sun, "Channels Combining Techniques for a Novel Two Steps Acquisition of New Composite GNSS Signals in Presence of Bit Sign Transitions" IEEE/ION PLANS 2010, pp. 443-457.

Tsui, "Fundamentals of Global Positioning System Receivers: A Software Approach", John Wiley & Sons, Inc., 2000, pp. 140-145.

Yang, "FFT Acquisition of Periodic, Aperiodic, Puncture, and Overlaid Code Sequences in GPS", Proceedings of the ION GPS 2001, pp. 137-147, 2011.

* cited by examiner

SIGNAL ACQUISITION DEVICE

TECHNICAL FIELD

The present invention relates to a signal acquisition device that performs signal detection and initial synchronization by obtaining correlation between a received signal corresponding to one ranging code period and code replicas.

BACKGROUND ART

A global navigation satellite system (GNSS) signal acquisition device constituted by software or a field-programmable gate array (FPGA) performs signal detection, and initial synchronization of code phase and Doppler frequency by obtaining correlation between a received signal corresponding to one ranging code period and a code replica. Circular convolution is widely used for a correlation process in signal acquisition (refer, for example, to Non-patent Literature 1). A correlation process using circular convolution can be used since a ranging code included in a GNSS signal is a periodic signal. A characteristic of this technique is that the correlation process can be performed with a small amount of computation.

Signal acquisition using circular convolution is based on complete periodicity of a ranging code. Although a ranging code in a GNSS signal is periodic, it may change in polarity at some point. In a case where circular convolution is performed using a received signal in which a ranging code changes in polarity, a correlation value lowers or a correlation peak position deviates, which lowers detection probability and causes Doppler frequency error.

In a C/A code, which is a consumer code that has been conventionally used, a data sign of a navigation message determines the polarity of a ranging code, and thus a change in polarity can occur only at a boundary of the navigation message bit (bit length of one navigation message=20 periods of ranging code). Thus, the frequency of occurrence of a change in polarity is low, and the influence thereof on signal acquisition using circular convolution can be ignored.

In the meantime, GNSS signals in which codes called overlay codes or secondary codes are overlaid on ranging codes have been increasing in recent years (for example, E5a signals in Galileo systems). In such a GNSS signal, a change in polarity of a ranging code occurs frequently since the sign of the overlaid code, in addition to the navigation message, determines the polarity of the ranging code. Thus, with the conventional technique using circular convolution, the influence of degradation in acquisition performance due to a change in polarity is high. As a measure for this problem, there is therefore a technique of acquiring a received signal equal to or longer than a ranging code period and obtaining correlation between the received signal and a code replica by using linear convolution (refer, for example, to Non-patent Literature 2).

CITATION LIST

Non-Patent Literatures

Non-patent Literature 1: J. B. Y. Tsui, "Fundamentals of Global Positioning System Receivers: A Software Approach," John Wiley & Sons, Inc., published in 2000, pp. 140-144

Non-patent Literature 2: C. Yang, "FFT Acquisition of Periodic, Aperiodic, Puncture, and Overlaid Code Sequences in GPS," Proceedings of the ION GPS 2001, pp. 137-147, 2011

SUMMARY OF INVENTION

Technical Problem

With such a technique using linear convolution as mentioned above, degradation in acquisition probability and Doppler frequency error due to a change in polarity of a ranging code do not occur. This, however, requires a received signal equal to or longer than a ranging code period, which also have a problem of increase in the scale of processing.

The present invention has been made to solve such problems, and an object thereof is to provide a signal acquisition device capable of preventing the degradation in performance due to a change in polarity while suppressing the increase in the scale of processing.

Solution to Problem

A signal acquisition device according to the present invention includes: an RF frontend for performing frequency conversion and A/D conversion on a received signal, the received signal being a signal transmitted from a satellite; a signal acquiring unit for performing signal detection and initial synchronization on an output from the RF frontend by circular convolution operation using a first code replica corresponding to a case where a ranging code does not change in polarity and a second replica corresponding to a case where a ranging code changes in polarity; and a signal tracking unit for performing synchronization tracking using a result of signal acquisition output from the signal acquiring unit as an initial value, wherein the first code replica and the second code replica are generated by application of constant amounts of phase rotation that are different from each other to the ranging code at each sampling point, and the amount of phase rotation applied for generation of the first code replica is set to $2\pi(M/N)n$ and the amount of phase rotation applied for generation of the second code replica is set to $2\pi\{(2M+1)/2N\}n$ where M represents a given integer, N represents the number of sampling points in one period of the ranging code, and n represents the number of each sampling point.

Advantageous Effects of Invention

A signal acquisition device according to the present invention performs circular convolution operation using a first code replica corresponding to a case where a ranging code does not change in polarity and a second code replica corresponding to a case where a ranging code changes in polarity, the first code replica and the second code replica being generated by applying constant amounts of phase rotation that are different from each other to the ranging code at each sampling point. This reduces the length of received signals, so that the increase in the scale of processing is reduced, and prevents the degradation in performance due to the change in polarity.

DESCRIPTION OF EMBODIMENTS

Embodiments for carrying out the invention will now be described with reference to the accompanying drawings for more detailed explanation of the invention.

First Embodiment

Figure 1:
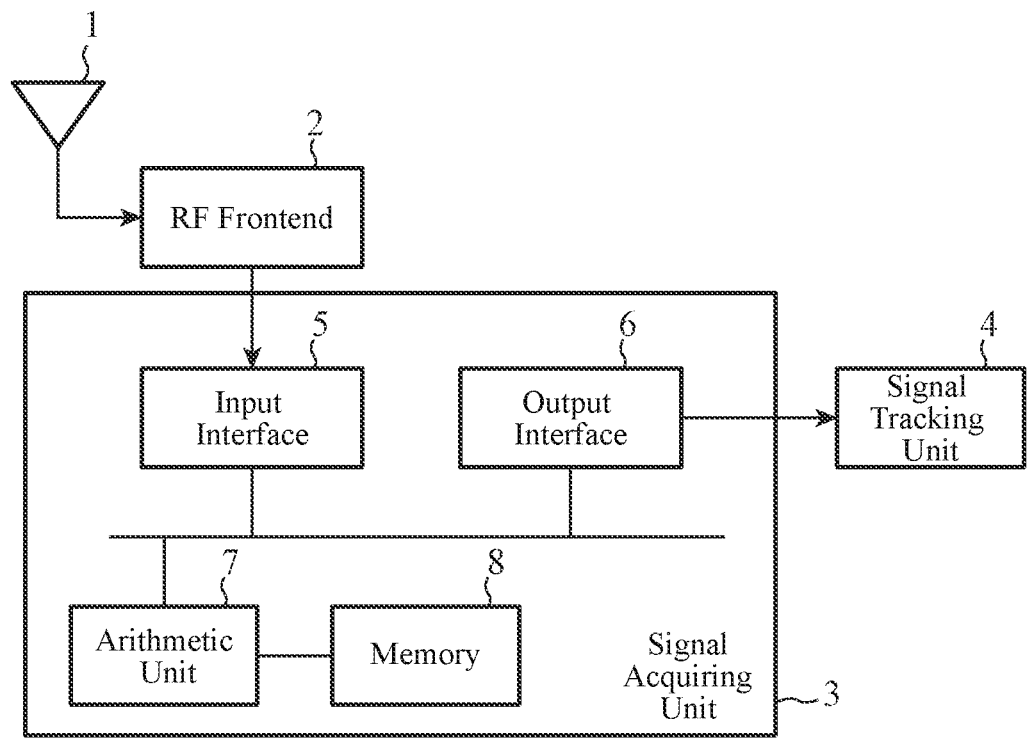
FIG. 1 is a configuration diagram of a signal acquisition device according to a first embodiment of the present invention.

FIG. 1 is a configuration diagram of a signal acquisition device according to the present invention.

The illustrated signal acquisition device includes a receiving antenna 1, an RF frontend 2, a signal acquiring unit 3, and a signal tracking unit 4. The receiving antenna 1 is an antenna that receives signals transmitted from a satellite. The RF frontend 2 is a processing unit that performs frequency conversion and A/D conversion on a received signal received by the receiving antenna 1. The signal acquiring unit 3 is a processing unit that performs signal detection and initial synchronization on a signal from the RF frontend 2 by circular convolution operation using a first code replica corresponding to a case where a ranging code does not change in polarity and a second code replica corresponding to a case where a ranging code changes in polarity. The signal tracking unit 4 is a processing unit that performs synchronization tracking using the result of signal acquisition output by the signal acquiring unit 3 as an initial value.

Specifically, in the signal acquisition device according to the first embodiment, a GNSS signal that is received by the receiving antenna 1 is subjected to frequency conversion and A/D conversion by the RF frontend 2, and transferred to the signal acquiring unit 3. The signal acquiring unit 3 performs detection and initial synchronization of the GNSS signal, and outputs the result to the signal tracking unit 4. The signal tracking unit 4 performs synchronization tracking of the GNSS signal using the result of signal acquisition as the initial value.

The signal acquiring unit 3 includes an input interface 5 for inputting an A/D-converted received signal, an output interface 6 for outputting a result of signal acquisition to the signal tracking unit 4, an arithmetic unit 7 that performs operations of signal acquisition, and a memory 8 that holds code replicas and the like. For the arithmetic unit 7, a central processing unit (CPU) or a field programmable gate array (FPGA) can be used, for example.

Figure 2:
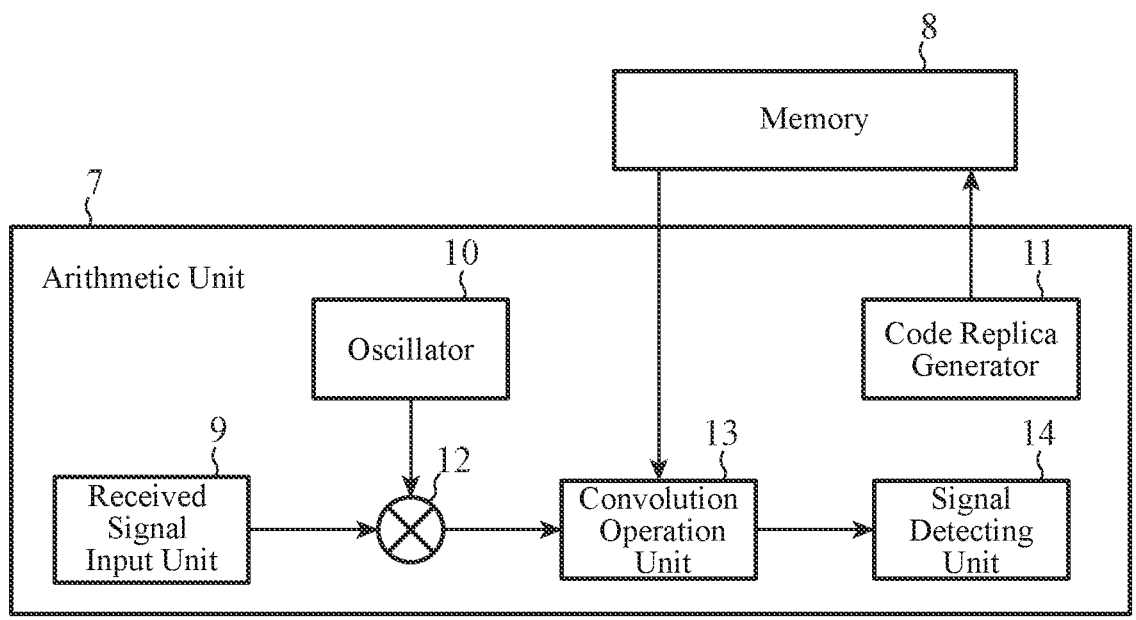
FIG. 2 is a configuration diagram of an arithmetic unit in the signal acquisition device according to the first embodiment of the present invention.

FIG. 2 is a functional configuration diagram of the arithmetic unit 7. The arithmetic unit 7 includes a received signal input unit 9, an oscillator 10, a code replica generator 11, a multiplication unit 12, convolution operation unit 13, and a signal detecting unit 14.

The received signal input unit 9 acquires a received signal corresponding to one ranging code period. The oscillator 10 generates a reference signal for frequency conversion. The code replica generator 11 generates a replica of a ranging code, and stores the generated replica in the memory 8. The multiplication unit 12 mixes the received signal acquired by the received signal input unit 9 and the reference signal generated by the oscillator 10 to convert the frequency of the received signal. The convolution operation unit 13 calculates correlation values between the frequency-converted signal and the code replicas generated by the code replica generator 11 and stored in the memory 8 by using circular convolution. The convolution operation unit 13 repeats these processes while changing the frequency of the reference signal generated by the oscillator 10. The signal detecting unit 14 determines whether or not a GNSS signal is received on the basis of the maximum strength of the obtained correlation value, and when a GNSS signal is determined to be received, obtains the Doppler frequency and the code phase of the GNSS signal from a peak position of the correlation value.

Figure 3:
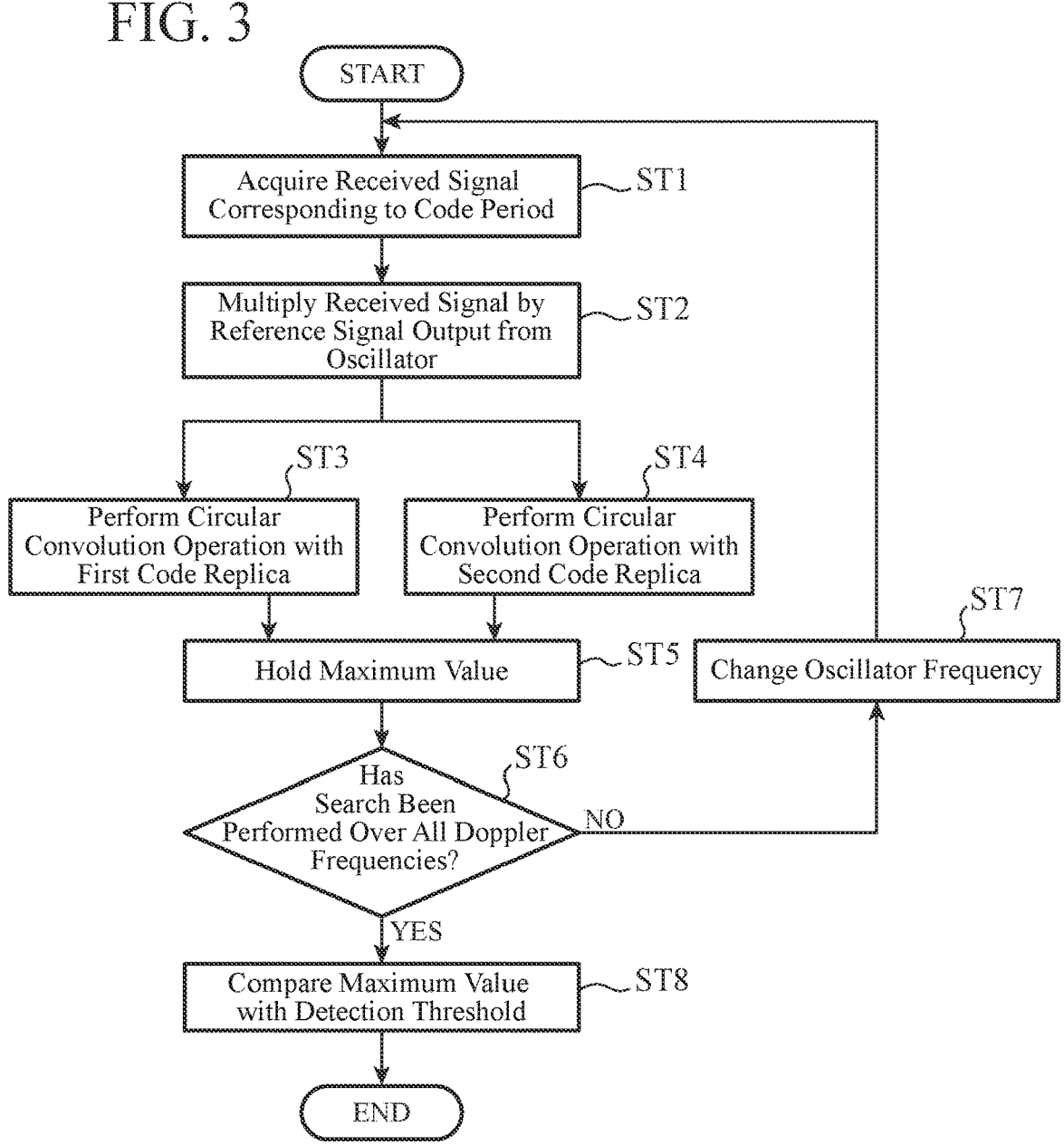
FIG. 3 is a flowchart illustrating processing of the arithmetic unit in the signal acquisition device according to the first embodiment of the present invention.

A flowchart of the processes performed by the arithmetic unit 7 is illustrated in FIG. 3. The present embodiment is characterized in that the code replica generator 11 generates a second code replica with which a correlation value can be obtained without loss when the polarity of a ranging code changes in a received signal, in addition to a first code replica with which a correlation value can be obtained without loss when the polarity of a ranging code does not change in a received signal, which has conventionally been used, and performs circular convolution of each of the two code replicas and the received signal (steps ST3 and ST4).

The first code replica used in conventional techniques is represented by $r_1[n]$ (n=0 to N−1; n is a sample number). Note that N is the number of samples corresponding to one ranging code period. Specifically, when T represents a ranging code period, $T_s$ represents a sampling period, N is expressed as $N=T/T_s$. In this case, the first code replica $r_1[n]$ is expressed by the following formula by using a ranging code c(t) (a binary signal of −1 or +1) transmitted from a GNSS satellite.

$$r_1[n] = c(nT_s) \tag{1}$$

In the present embodiment, the second code replica expressed by the following formula is used in addition to the first code replica of the above formula. In the formula, M is a given integer. Specifically, the second code replica $r_2[n]$ is obtained by applying phase rotation specific to each sampling point to the ranging code.

$$r_2[n] = r_1[n]\exp\left(j2\pi\frac{2M+1}{2N}n\right) \tag{2}$$

First, the received signal input unit 9 acquires a received signal corresponding to a code period (step ST1), and the multiplication unit 12 multiplies the received signal by the reference signal from the oscillator 10 (step ST2) and passes the multiplication result to the convolution operation unit 13.

A GNSS signal component s(n,f) (n=0 to N−1) of the received signal corresponding to one ranging code period (=T), which is a signal input to the convolution operation unit 13, can be expressed by the following formula. In the formula, A represents signal amplitude, $N_\tau T$ represents the first sample position (code phase) of the ranging code period, p[n] represents the polarity (+1 or −1) of the ranging code, $f_{IF}$ represents IF center frequency, $f_d$ represents Doppler frequency, f represents the oscillation frequency of the oscillator 10, and Φ represents initial phase.

$$s(n, f) = Ac((n - N_\tau)T_S)p[n]\exp(j2\pi(f_{IF} + f_d - f)nT_S)\exp(j\varphi) \quad (3)$$
$$= Ar_1[n - N_\tau]p[n]\exp(j2\pi(f_{IF} + f_d - f)nT_S)\exp(j\varphi)$$

The convolution operation unit 13 performs circular convolution operation on such an input signal by using the first code replica and the second code replica stored in the memory 8 (steps ST3 and ST4).

When an estimate value of the code phase is represented by $\bar{n}$ and an estimate value of the Doppler frequency is represented by $\bar{f}_d$, output values of correlation operations using the first code replica and the second code replica are expressed by the following formulas, respectively.

$$R_1(\bar{n}, \bar{f}_d) = \sum_{n=0}^{N-1} [r_1^*[n]s(\mathrm{mod}(n + \bar{n}, N), f_{IF} + \bar{f}_d)] \quad (4)$$

$$R_2(\bar{n}, \bar{f}_d) = \sum_{n=0}^{N-1} \left[r_2^*[n]s\left(\mathrm{mod}(n + \bar{n}, N), f_{IF} + \bar{f}_d + \frac{2M+1}{2NT_S}\right)\right] \quad (5)$$

The estimate values of the code phase and the Doppler frequency are equal to the true values of the GNSS signal, that is, the outputs of correlation operations using circular convolution when $\bar{n}=N_\tau$ and $\bar{f}_d=f_d$ are as expressed by the following formulas.

$$|R_1(N_\tau, f_d)| = A\left|\sum_{n=0}^{N-1} p[n]\right| \quad (6)$$

$$|R_2(N_\tau, f_d)| = A\left|\sum_{n=0}^{N_\tau-1} p[n] - \sum_{n=N_\tau}^{N-1} p[n]\right| \quad (7)$$

Figure 4:
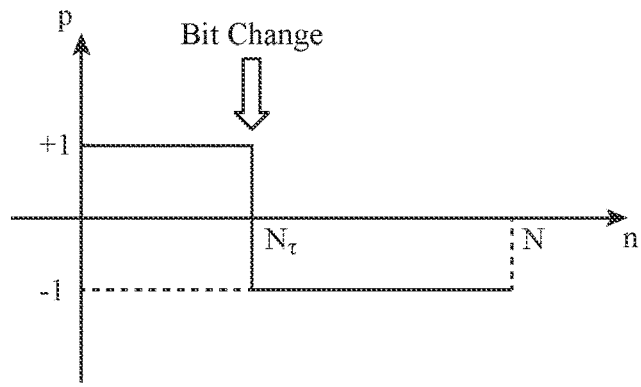
FIG. 4 is an explanatory diagram illustrating a change in polarity of a ranging code.

Note that the polarity p[n] can be changed only at a boundary position $N_\tau$ of a ranging code (An example is illustrated in FIG. 4. See the bit change indicated by an arrow in FIG. 4.). Thus, the following formula is satisfied. In the formula, $p_1$ and $p_2$ represent scalar values each having a value of +1 or −1.

$$p[n] = \begin{cases} p_1 & (0 \le n < N_\tau) \\ p_2 & (N_\tau \le n < N) \end{cases} \quad (8)$$

The following formulas are obtained by substituting the formula (8) into the formula (6) and the formula (7), respectively. The following formulas express the correlation values in a case where the polarity does not change ($p_1=p_2$) and in a case where the polarity changes ($p_1=-p_2$).

$$|R_1(N_\tau, f_d)| = \begin{cases} AN & (p_1 = p_2) \\ A|N - 2N_\tau| & (p_1 = -p_2) \end{cases} \quad (9)$$

$$|R_2(N_\tau, f_d)| = \begin{cases} A|N - 2N_\tau| & (p_1 = p_2) \\ AN & (p_1 = -p_2) \end{cases} \quad (10)$$

The above formulas (9) and (10) indicate that, in the case where the polarity does not change in the received signal used for calculation of correlation values, the correlation value can be obtained without any loss by circular convolution using the first code replica ($|(R_1(N_\tau,f_d)|=AN$). In addition, in the case where a change in polarity occurs in the received signal, the correlation value can be obtained without any loss by circular convolution using the second code replica ($|(R_2(N_\tau,f_d)|=AN$).

Thus, the convolution operation unit 13 obtains a correlation value without loss by using circular convolution regardless of whether the polarity changes or not by holding the maximum value of the outputs of circular convolution using the first code replica and the second code replica (step ST5).

The convolution operation unit 13 performs such circular convolution operation while changing the reference signal generated by the oscillator 10 (step ST7) to search over all the Doppler frequencies (step ST6). If search has been performed over all the Doppler frequencies in step ST6, the signal detecting unit 14 compares the maximum value obtained by the convolution operation unit 13 with a predetermined detection threshold, and determines that a GNSS signal is received if the maximum value satisfies the detection threshold (step ST8). Note that the search range for Doppler frequencies has a value determined from estimated satellite speed and receiver speed, such as about ±several kHz, for example.

While the formula (1), which has been conventionally used, is presented as the first code replica, the following formula may alternatively be used as the first code replica. In the formula, M is a given integer.

$$r_1[n] = c(nT_S)\exp\left(j2\pi\frac{M}{N}n\right) \quad (11)$$

In addition, while the maximum value is stored in step ST5 described above, values not smaller than a preset value including the maximum value may be stored and a value may be selected from among them.

As described above, according to the signal acquisition device of the first embodiment, which includes the RF frontend that performs frequency conversion and A/D conversion on a received signal, which is a signal transmitted from a satellite, the signal acquiring unit that performs signal detection and initial synchronization on an output from the RF frontend by circular convolution operation using a first code replica corresponding to the case where a ranging code does not change in polarity and a second code replica corresponding to the case where a ranging code changes in polarity, and the signal tracking unit that performs synchronization tracking using the result of signal acquisition output from the signal acquiring unit as an initial value, the length of received signals is reduced, so that the increase in the scale of processing is reduced, and the degradation in performance due to the change in polarity is prevented.

In addition, according to the signal acquisition device of the first embodiment, the first code replica and the second code replica are generated by applying phase rotation specific to each sampling point to a ranging code, which enables the first code replica and the second code replica to be obtained easily.

In addition, according to the signal acquisition device of the first embodiment, the signal acquiring unit selects a value that is equal to or larger than a preset value from correlation values obtained by circular convolution operation using the first code replica and the second code replica to perform signal detection, which enables a correlation value to be obtained without loss regardless of whether the polarity changes or not.

Second Embodiment

While the maximum value of the outputs of circular convolution using the first code replica and the second code replica is selected and signal detection is performed in the first embodiment, the outputs can be added (non-coherent integration) and signal detection can then be performed, which will be described as a second embodiment below.

Since the configurations of a signal acquisition device according to the second embodiment in a drawing are the same as those in FIGS. 1 and 2, the configurations in these figures will be used in the description. The signal acquiring unit 3 of the second embodiment is configured to add correlation values obtained by circular convolution operation using the first code replica and the second code replica and perform signal detection. The receiving antenna 1, the RF frontend 2, and the signal tracking unit 4 are similar to those in the first embodiment, and thus the description thereof will not be repeated here.

Figure 5:
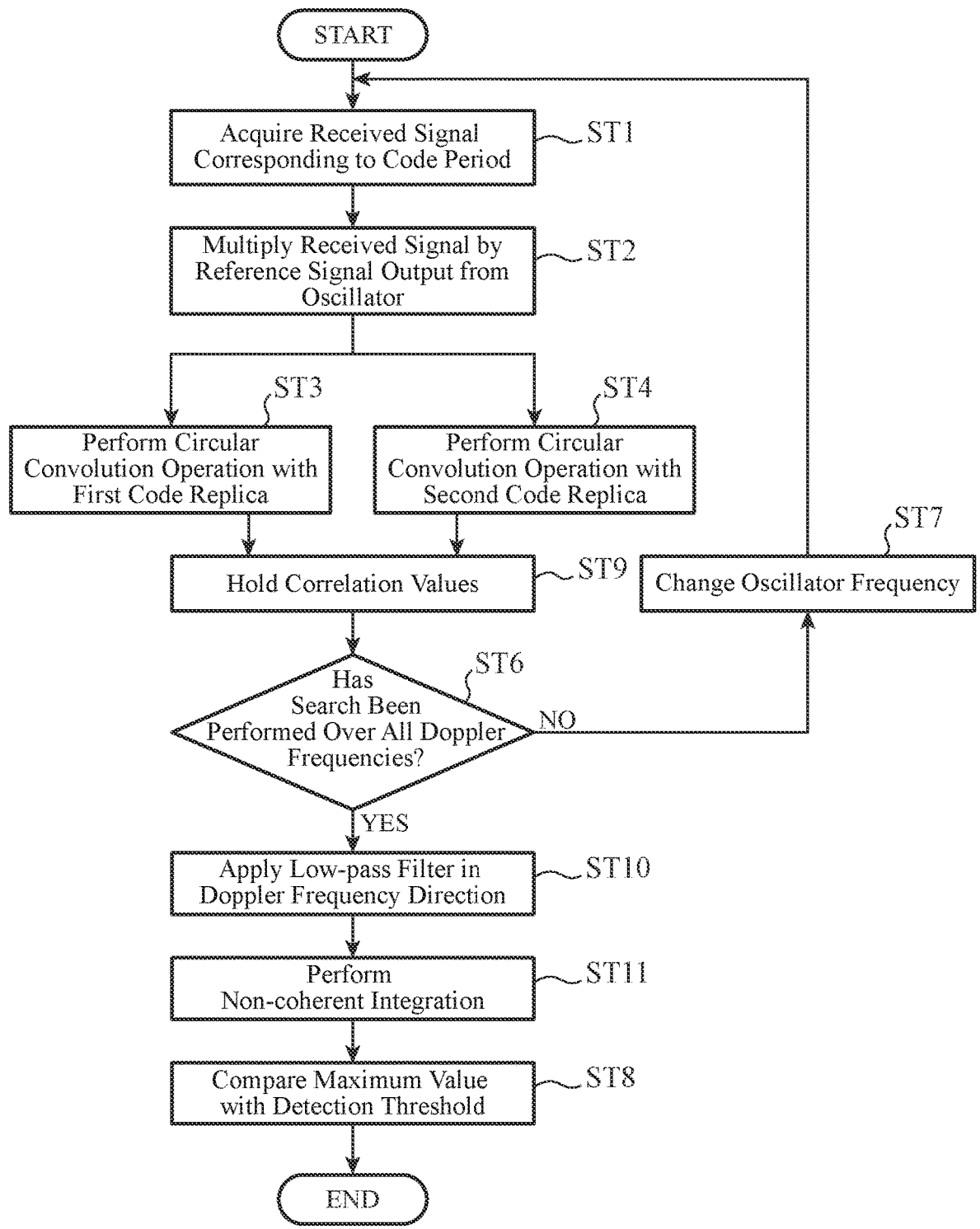
FIG. 5 is a flowchart illustrating processing of an arithmetic unit in a signal acquisition device according to a second embodiment of the present invention.

FIG. 5 is a flowchart illustrating operation of the arithmetic unit 7 in the second embodiment. Steps ST1 to ST4 are similar to those in the first embodiment, and thus the description thereof will not be repeated here. Subsequently, only the maximum value of the correlation values obtained in steps ST3 and ST4 is stored in step ST5 of the first embodiment; in the second embodiment, the convolution operation unit 13 stores all the correlation values (step ST9).

Both of the circular convolution using the first code replica when a received signal includes a change in polarity and the circular convolution using the second code replica when a received signal includes no change in polarity are characterized in that correlation power is distributed around a true Doppler frequency and that the correlation value is not maximum at the true Doppler frequency.

Figure 6A:
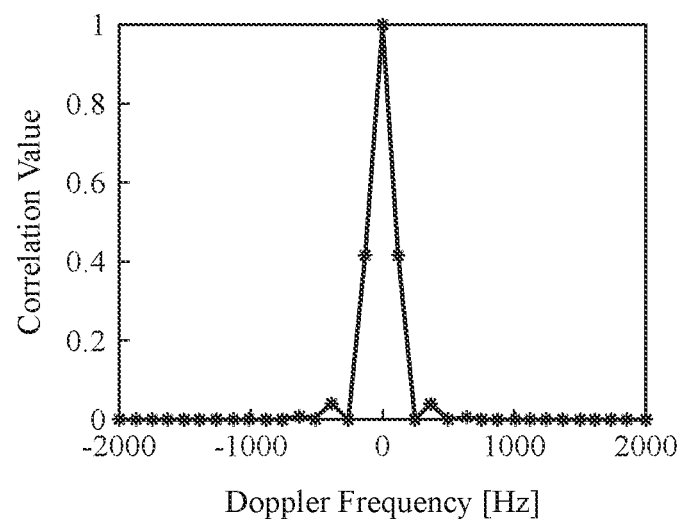
FIG. 6A is an explanatory graph illustrating a case where polarity does not change and FIG. 6B is an explanatory graph illustrating a case where polarity changes when a first code replica is used in the signal acquisition device according to the second embodiment of the present invention.
Figure 6B:
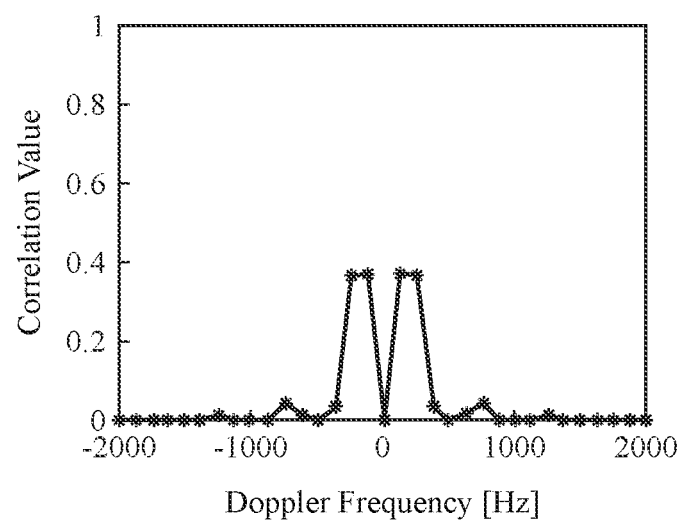

FIG. 6 illustrates images of correlation outputs when the first code replica is used. FIG. 6A illustrates the case where the polarity does not change and FIG. 6B illustrates a state in which the polarity changes. When the first code replica is used, a phenomenon in which correlation outputs are distributed around the true Doppler frequency occurs as illustrated in FIG. 6B. When the second code replica is used, the states of FIG. 6A and FIG. 6B are reversed.

This phenomenon is expressed by a formula as follows. When the first code replica is used, and when a code phase estimate value is assumed to be equal to the true code phase ($\bar{n}=N_\tau$), the formula (4) becomes the following formula.

$$R_1(N_\tau, \bar{f}_d) = \sum_{n=0}^{N-N_\tau-1} [r_1^*[n]s(n+N_\tau, f_{IF}+\bar{f}_d)] + \quad (12)$$

-continued $$\sum_{n=N-N_\tau}^{N-1} [r_1^*[n]s(n+N_\tau-N, f_{IF}+\bar{f}_d)]$$

$$= A\exp(j\varphi) \cdot \left\{ \begin{array}{l} p_1 \sum_{n=0}^{N-N_\tau-1} \exp(j2\pi(f_d-\bar{f}_d)nT_s) + \\ p_2 \sum_{n=N-N_\tau}^{N-1} \exp(j2\pi(f_d-\bar{f}_d)nT_s) \end{array} \right\}$$

In the above formula, $p_1$ and $p_2$ represent scalar values each having a value +1 or −1 in the formula (8). Note that, in the case where the polarity changes ($p_1=-p_2$), the expression (12) becomes as follows.

$$|R_i(N_\tau, \bar{f}_d)| = \quad (13)$$

$$A \left| \sum_{n=0}^{N-N_\tau-1} \exp(j2\pi(f_d-\bar{f}_d)nT_s) - \sum_{n=N-N_\tau}^{N-1} \exp(j2\pi(f_d-\bar{f}_d)nT_s) \right|$$

These formulas show that the correlation output at the Doppler frequency of $\bar{f}_d \neq f_d$ becomes large particularly when $N_\tau=N/2$. When the second code replica is used, a similar result is obtained by expanding the formula (5) setting $p_1=p_2$.

Figure 7:
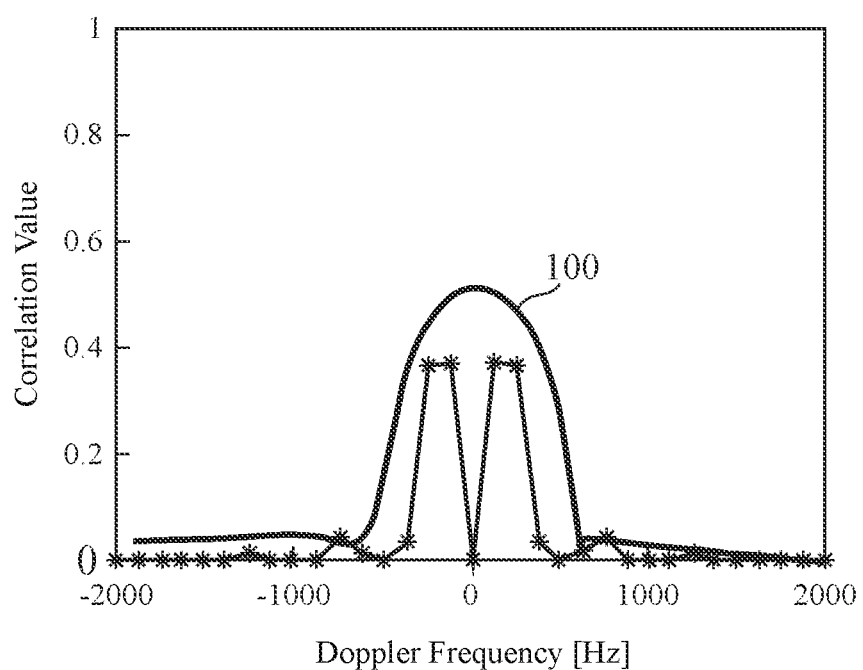
FIG. 7 is an explanatory graph illustrating correlation values after low-pass filter application in the signal acquisition device according to the second embodiment of the present invention.

Thus, if all the Doppler frequencies have been searched for in step ST6, the convolution operation unit 13 of the second embodiment subsequently applies a low-pass filter in the Doppler frequency direction to the correlation value obtained by using the first code replica and the correlation value obtained by using the second code replica (step ST10). As a result of this process, the peak of the correlation value corresponds to the true Doppler frequency. FIG. 7 is an explanatory graph illustrating this process. Since the low-pass filter is applied in the Doppler frequency direction, the peak of the correlation value is around the true Doppler frequency (0 Hz) as indicated by a curve 100 in FIG. 7. In addition, this process also has an effect of reducing Doppler frequency sidelobes.

Thereafter, the convolution operation unit 13 performs non-coherent integration of the correlation values (step ST11), and the signal detecting unit 14 performs signal acquisition by comparing the maximum value thereof with the detection threshold (step ST8). The correlation value peaks are integrated at the true signal position and dispersion at positions other than the true signal positions is reduced as a result of the non-coherent integration, which produces an effect of improving detection probability as compared to signal detection using a single correlation value.

Note that a moving average filter or the like can be used as the low-pass filter in step ST10 above.

As described above, according to the signal acquisition device of the second embodiment, the signal acquiring unit adds the correlation values obtained by circular convolution operation using the first code replica and the second code replica and performs signal detection, which improves detection probability in the signal detection.

In addition, according to the signal acquisition device of the second embodiment, the signal acquiring unit adds the correlation values after applying the low-pass filter in the Doppler frequency direction, which enables the correlation value peak to be obtained more accurately and further improves detection probability in the signal detection.

Third Embodiment

Signal acquisition processing architecture that performs circular convolution operation in GNSS signal acquisition by using discrete Fourier transform (DFT) or fast Fourier transform (FFT) is called parallel code-phase search (PCS) and used widely by GNSS signal acquisition devices (refer, for example, to Non-patent Literature 2). The signal acquisition devices of the first and second embodiments can also be applied to a PCS architecture, which will be described as a third embodiment below.

Figure 8:
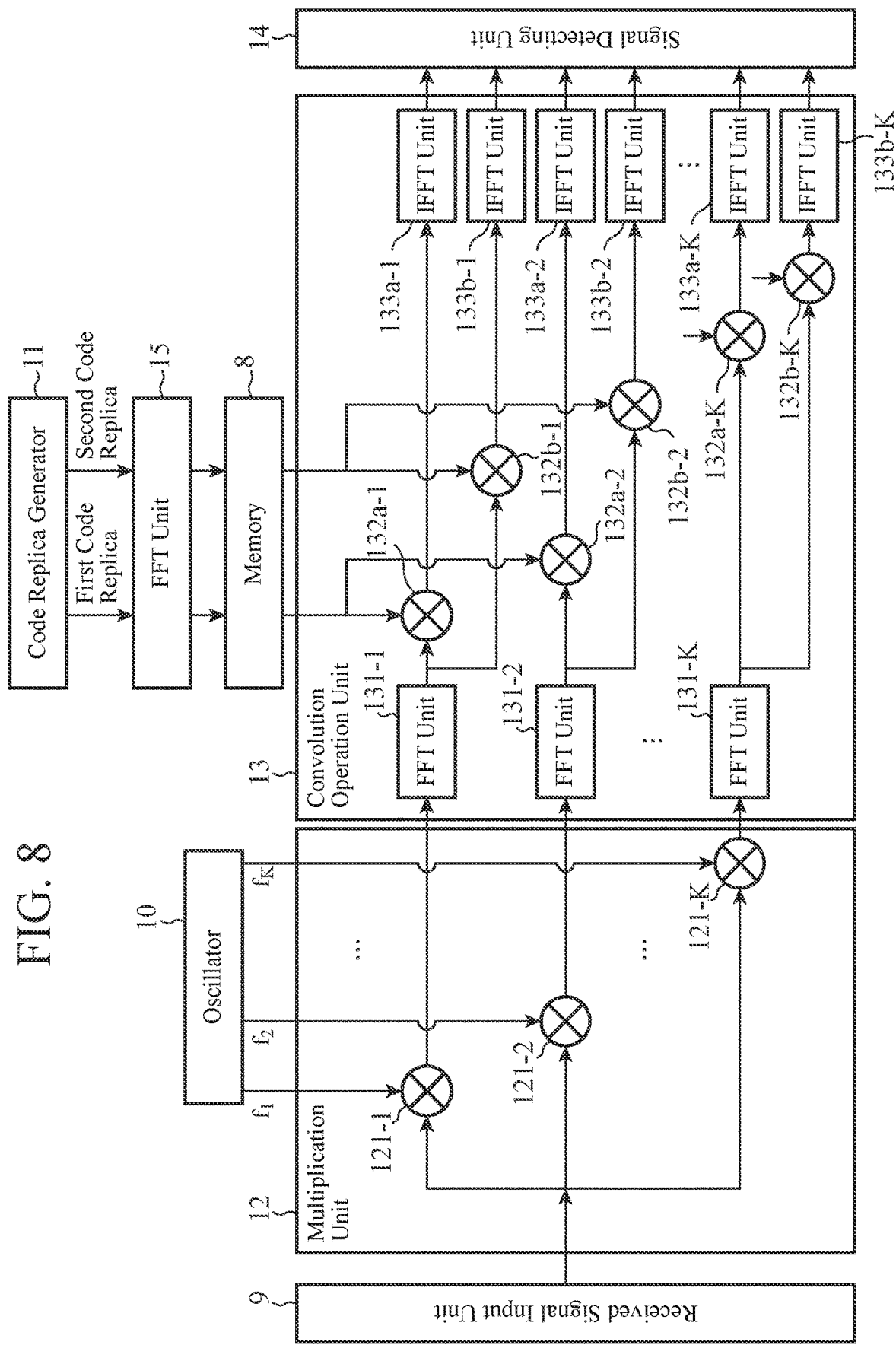
FIG. 8 is a configuration diagram of an arithmetic unit in a signal acquisition device according to a third embodiment of the present invention.

FIG. 8 is a configuration diagram illustrating main part of a signal acquisition device of the third embodiment. The signal acquisition device is an example of a configuration according to the PCS using the FFT, and has a configuration according to the third embodiment corresponding to the arithmetic unit 7 illustrated in FIG. 2. An oscillator 10 of the third embodiment is configured to output reference signals $f_1$ to $f_K$, and the multiplication unit 12 includes multipliers 121-1 to 121-K each being configured to multiply corresponding one of the reference signals $f_1$ to $f_K$ from the oscillator 10 by a received signal from the received signal input unit 9. The convolution operation unit 13 is configured to perform convolution operation on each of the signals output from the multiplication unit 12. Specifically, the convolution operation unit 13 includes FFT units 131-1 to 131-K each associated with corresponding one of output signals from the multiplication unit 12, multipliers 132a-1 to 132a-K each performing multiplication by a first code replica stored in the memory 8, multipliers 132b-1 to 132b-K each performing multiplication by a second code replica stored in the memory 8, IFFT units 133a-1 to 133a-K associated with outputs of the multipliers 132a-1 to 132a-K, respectively, and IFFT units 133b-1 to 133b-K associated with outputs of the multipliers 132b-1 to 132b-K, respectively. Note that the first code replica and the second code replica stored in the memory 8 are code replicas obtained by the FFT unit 15 performing FFT on the code replicas generated by the code replica generator 11. In addition, the IFFT unit 133a-1 to 133a-K and 133b-1 to 133b-K are processing units that perform inverse FFT of the FFT at the FFT units 131-1 to 131-K.

Thus, the arithmetic unit 7 of the third embodiment obtains correlation values of all code phases by using FFT at each of oscillator frequencies from the oscillator 10, and outputs the correlation values to the signal detecting unit 14. This configuration achieves circular convolution operation with a small amount of computation at high speed.

While FFT is used in the configuration of FIG. 8, a configuration using DFT may obviously be alternatively employed.

As described above, according to the signal acquisition device of the third embodiment, the signal acquiring unit performs circular convolution operation using fast Fourier transform or discrete Fourier transform, which achieves circular convolution operation with a small amount of computation at high speed.

Note that the embodiments of the present invention can be freely combined, any components in the embodiments can be modified, and any components in the embodiments can be omitted within the scope of the invention.

INDUSTRIAL APPLICABILITY

As described above, the signal acquisition device according to the present invention relates to a configuration for performing signal acquisition by using circular convolution operation suitable for use in a GNSS signal acquisition device.

REFERENCE SIGNS LIST 1 receiving antenna
2 RF frontend
3 signal acquiring unit
4 signal tracking unit
5 input interface
6 output interface
7 arithmetic unit
8 memory
9 received signal input unit
10 oscillator
11 code replica generator
12 multiplication unit
13 convolution operation unit
14 signal detecting unit
15, 131-1 to 131-K FFT unit
121-1 to 121-K, 132a-1 to 132a-K, 132b-1 to 132b-K multiplier
133a-1 to 133a-K, 133b-1 to 133b-K IFFT unit

The invention claimed is:

1. A signal acquisition device comprising:
an RF frontend that performs frequency conversion and A/D conversion on a received signal, the received signal being a signal transmitted from a satellite;
a signal acquirer that performs signal detection and initial synchronization on an output from the RF frontend by circular convolution operation using a first code replica corresponding to a case where a ranging code does not change in polarity and a second replica corresponding to a case where a ranging code changes in polarity; and
a signal tracker that performs synchronization tracking using a result of signal acquisition output from the signal acquirer as an initial value, wherein
the first code replica and the second code replica are generated by applying constant amounts of phase rotation that are different from each other to the ranging code at each sampling point, and
the amount of phase rotation applied for generation of the first code replica is set to $2\pi(M/N)n$ and the amount of phase rotation applied for generation of the second code replica is set to $2\pi\{(2M+1)/2N\}n$ where M represents a given integer, N is an integer representing a total number of sampling points in one period of the ranging code, and n is an integer representing a number of an individual sampling point of the total number of sampling points N.

2. The signal acquisition device according to claim 1, wherein the signal acquirer selects a value that is equal to or larger than a preset value from correlation values obtained by the circular convolution operation using the first code replica and the second code replica to perform the signal detection.

3. The signal acquisition device according to claim 2, wherein the signal acquirer adds correlation values obtained by the circular convolution operation using the first code replica and the second code replica to perform the signal detection.

4. The signal acquisition device according to claim 3, wherein the signal acquirer adds the correlation values after applying a low-pass filter in a Doppler frequency direction.

5. The signal acquisition device according to claim 1, wherein the signal acquirer performs the circular convolution operation by using fast Fourier transform or discrete Fourier transform.

* * * * *